US012236445B2

(12) United States Patent
Ono et al.

(10) Patent No.: US 12,236,445 B2
(45) Date of Patent: Feb. 25, 2025

(54) REWARD DETERMINATION SYSTEM AND REWARD DETERMINATION METHOD

(71) Applicant: Japan Display Inc., Tokyo (JP)

(72) Inventors: Yuji Ono, Tokyo (JP); Kei Tamura, Tokyo (JP); Hiromi Mitani, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/513,177

(22) Filed: Nov. 17, 2023

(65) Prior Publication Data
US 2024/0177186 A1    May 30, 2024

(30) Foreign Application Priority Data
Nov. 25, 2022 (JP) ................................. 2022-187948

(51) Int. Cl.
*G06Q 30/0208* (2023.01)
(52) U.S. Cl.
CPC ................. *G06Q 30/0208* (2013.01)
(58) Field of Classification Search
None
See application file for complete search history.

(56) References Cited
U.S. PATENT DOCUMENTS

2017/0301039 A1\* 10/2017 Dyer .............. G06Q 10/063114
2020/0135304 A1\*  4/2020 Yanagimoto ....... G06Q 30/0239
2020/0202038 A1\*  6/2020 Zhang ................... G16B 30/10
2021/0056009 A1\*  2/2021 Gal ............................ G06F 8/71
2021/0182767 A1\*  6/2021 Tibrewala ....... G06Q 10/063114
2021/0217523 A1\*  7/2021 Morimoto .............. G16H 50/70
2022/0415524 A1\* 12/2022 Kefayati ................. G16H 50/80
2023/0078263 A1\*  3/2023 Seledkin ............... H04L 51/216
                                                                  707/737

FOREIGN PATENT DOCUMENTS

WO          2022060606 A1     3/2022

\* cited by examiner

*Primary Examiner* — Allan J Woodworth, II
(74) *Attorney, Agent, or Firm* — K&L Gates LLP

(57) ABSTRACT

A reward determination system determines distribution of a reward received from a data user to reward distribution targets in a platform for distribution and utilization of biological data provided by data providers. Each reward distribution target has: development task information obtained by quantifying a workload of a task required for developing the platform into numbers; data provision task information obtained by quantifying a workload of a task required for providing the biological data into numbers; and data processing task information obtained by quantifying a workload of a task required for processing the biological data into numbers. A reliability parameter and a contribution parameter of each task are calculated based on the development task information, the data provision task information, and the data processing task information on each task, and a reward to be allocated is determined for each reward distribution target based on the reliability parameter and the contribution parameter.

22 Claims, 10 Drawing Sheets

| REWARD DISTRIBUTION TARGET | DEVELOPMENT TASK INFORMATION $a_0$ | DATA PROVISION TASK INFORMATION $a_1$ | DATA PROCESSING TASK INFORMATION $a_2$ |
|---|---|---|---|
| PLATFORM DEVELOPER | $a_{011}, a_{012}, ...$ | $a_{111}, a_{112}, ...$ | $a_{211}, a_{212}, ...$ |
| DATA PROCESSOR | $a_{021}, a_{022}, ...$ | $a_{121}, a_{122}, ...$ | $a_{221}, a_{222}, ...$ |
| DATA PROVIDER | $a_{031}, a_{032}, ...$ | $a_{131}, a_{132}, ...$ | $a_{231}, a_{232}, ...$ |
| ⋮ | ⋮ | ⋮ | ⋮ |
| DATA PROVIDER | $a_{0n1}, a_{0n2}, ...$ | $a_{1n1}, a_{1n2}, ...$ | $a_{2n1}, a_{2n2}, ...$ |

FIG.9

| REWARD DISTRIBUTION TARGET | RELIABILITY PARAMETER $r_{0i}$ (DEVELOPMENT TASK) | RELIABILITY PARAMETER $r_{1i}$ (DATA PROVISION TASK) | RELIABILITY PARAMETER $r_{2i}$ (DATA PROCESSING TASK) |
|---|---|---|---|
| PLATFORM DEVELOPER | $r_{01}$ | $r_{11}$ | $r_{21}$ |
| DATA PROCESSOR | $r_{02}$ | $r_{12}$ | $r_{22}$ |
| DATA PROVIDER | $r_{03}$ | $r_{13}$ | $r_{23}$ |
| ⋮ | ⋮ | ⋮ | ⋮ |
| DATA PROVIDER | $r_{0n}$ | $r_{1n}$ | $r_{2n}$ |

FIG.10

| REWARD DISTRIBUTION TARGET | CONTRIBUTION PARAMETER $c_{0i}$ (DEVELOPMENT TASK) | CONTRIBUTION PARAMETER $c_{1i}$ (DATA PROVISION TASK) | CONTRIBUTION PARAMETER $c_{2i}$ (DATA PROCESSING TASK) |
|---|---|---|---|
| PLATFORM DEVELOPER | $c_{01}$ | $c_{11}$ | $c_{21}$ |
| DATA PROCESSOR | $c_{02}$ | $c_{12}$ | $c_{22}$ |
| DATA PROVIDER | $c_{03}$ | $c_{13}$ | $c_{23}$ |
| ⋮ | ⋮ | ⋮ | ⋮ |
| DATA PROVIDER | $c_{0n}$ | $c_{1n}$ | $c_{2n}$ |

FIG.11A

| PLATFORM DEVELOPER | | CALCULATION RESULT | REWARD |
|---|---|---|---|
| DEVELOPMENT TASK | RELIABILITY PARAMETER $r_{01}$ | 0.95 | $808 |
| | CONTRIBUTION PARAMETER $c_{01}$ | 0.85 | |
| DATA PROVISION TASK | RELIABILITY PARAMETER $r_{11}$ | 0.05 | |
| | CONTRIBUTION PARAMETER $c_{11}$ | 0 | |
| DATA PROCESSING TASK | RELIABILITY PARAMETER $r_{21}$ | 0.05 | |
| | CONTRIBUTION PARAMETER $c_{21}$ | 0 | |

FIG.11B

| PLATFORM DEVELOPER | | CALCULATION RESULT | REWARD |
|---|---|---|---|
| DEVELOPMENT TASK | RELIABILITY PARAMETER $r_{02}$ | 0.05 | $157 |
| | CONTRIBUTION PARAMETER $c_{02}$ | 0 | |
| DATA PROVISION TASK | RELIABILITY PARAMETER $r_{12}$ | 0.5 | |
| | CONTRIBUTION PARAMETER $c_{12}$ | 0.1 | |
| DATA PROCESSING TASK | RELIABILITY PARAMETER $r_{22}$ | 0.82 | |
| | CONTRIBUTION PARAMETER $c_{22}$ | 0.95 | |

FIG.11C

| PLATFORM DEVELOPER | | CALCULATION RESULT | REWARD |
|---|---|---|---|
| DEVELOPMENT TASK | RELIABILITY PARAMETER $r_{03}$ | 0.01 | $10 |
| | CONTRIBUTION PARAMETER $c_{03}$ | 0 | |
| DATA PROVISION TASK | RELIABILITY PARAMETER $r_{13}$ | 0.7 | |
| | CONTRIBUTION PARAMETER $c_{13}$ | 0.68 | |
| DATA PROCESSING TASK | RELIABILITY PARAMETER $r_{23}$ | 0.01 | |
| | CONTRIBUTION PARAMETER $c_{23}$ | 0 | |

REWARD DETERMINATION SYSTEM AND REWARD DETERMINATION METHOD

CROSS-REFERENCE TO RELATED APPLICATION

This application claims the benefit of priority from Japanese Patent Application No. 2022-187948 filed on Nov. 25, 2022, the entire contents of which are incorporated herein by reference.

BACKGROUND

1. Technical Field

What is disclosed herein relates to a reward determination system and a reward determination method.

2. Description of the Related Art

Biological data (for example, brain wave data and heart rate data) acquired by a biological information sensor are expected to have a variety of needs for utilization in medical treatment, insurance, pharmaceuticals, local governments, and the like. Thus, a system configured to give a reward to a user providing biological data has been proposed. For example, a cryptocurrency system has been disclosed in which data on the body activity of a user that have been acquired by a client's sensor are transmitted to a server and cryptocurrency is paid to the user when predetermined conditions are satisfied (refer to WO2020/060606, for example).

In the above-described conventional system, data providers are paid a reward when conditions set by the cryptocurrency system are satisfied. On the other hand, there is a desire for a construction of an integrated reward determination system that includes the development, management, and operation of software and systems for the distribution and utilization of biological data and provision of high added value by data processing such as biological data analysis and processing.

For the foregoing reasons, there is a need for a reward determination system and a reward determination method that enable efficient distribution of rewards received from data users.

SUMMARY

According to an aspect, in a reward determination system configured to determine distribution of a reward received from a data user to a plurality of reward distribution targets in a platform for distribution and utilization of biological data provided by a plurality of data providers, the reward distribution targets each have: development task information obtained by quantifying a workload of a task required for developing the platform into numbers; data provision task information obtained by quantifying a workload of a task required for providing the biological data into numbers; and data processing task information obtained by quantifying a workload of a task required for processing the biological data into numbers. A reliability parameter and a contribution parameter of each of the tasks are calculated based on the development task information, the data provision task information, and the data processing task information on each of the tasks, and a reward to be allocated is determined for each of the reward distribution targets based on the reliability parameter and the contribution parameter calculated for each of the tasks.

According to an aspect, in a reward determination method for determining distribution of a reward received from a data user to a plurality of reward distribution targets in a platform for distribution and utilization of biological data provided by a plurality of data providers, the reward distribution targets each have: development task information obtained by quantifying a workload of a task required for developing the platform into numbers; data provision task information obtained by quantifying a workload of a task required for providing the biological data into numbers; and data processing task information obtained by quantifying a workload of a task required for processing the biological data into numbers. A reliability parameter and a contribution parameter of each of the tasks are calculated based on the development task information, the data provision task information, and the data processing task information on each of the tasks, and a reward to be allocated is determined for each of the reward distribution targets based on the reliability parameter and the contribution parameter calculated for each of the tasks.

BRIEF DESCRIPTION OF THE DRAWINGS

FIG. 9 is a diagram illustrating an example of reliability information;

FIG. 10 is a diagram illustrating an example of contribution information;

FIG. 11A is a diagram illustrating an example of results of reward determination processing for a platform developer;

FIG. 11B is a diagram illustrating an example of results of reward determination processing for a data processing operator; and FIG. 11C is a diagram illustrating an example of results of reward determination processing for a data provider.

DETAILED DESCRIPTION

Figure 1:
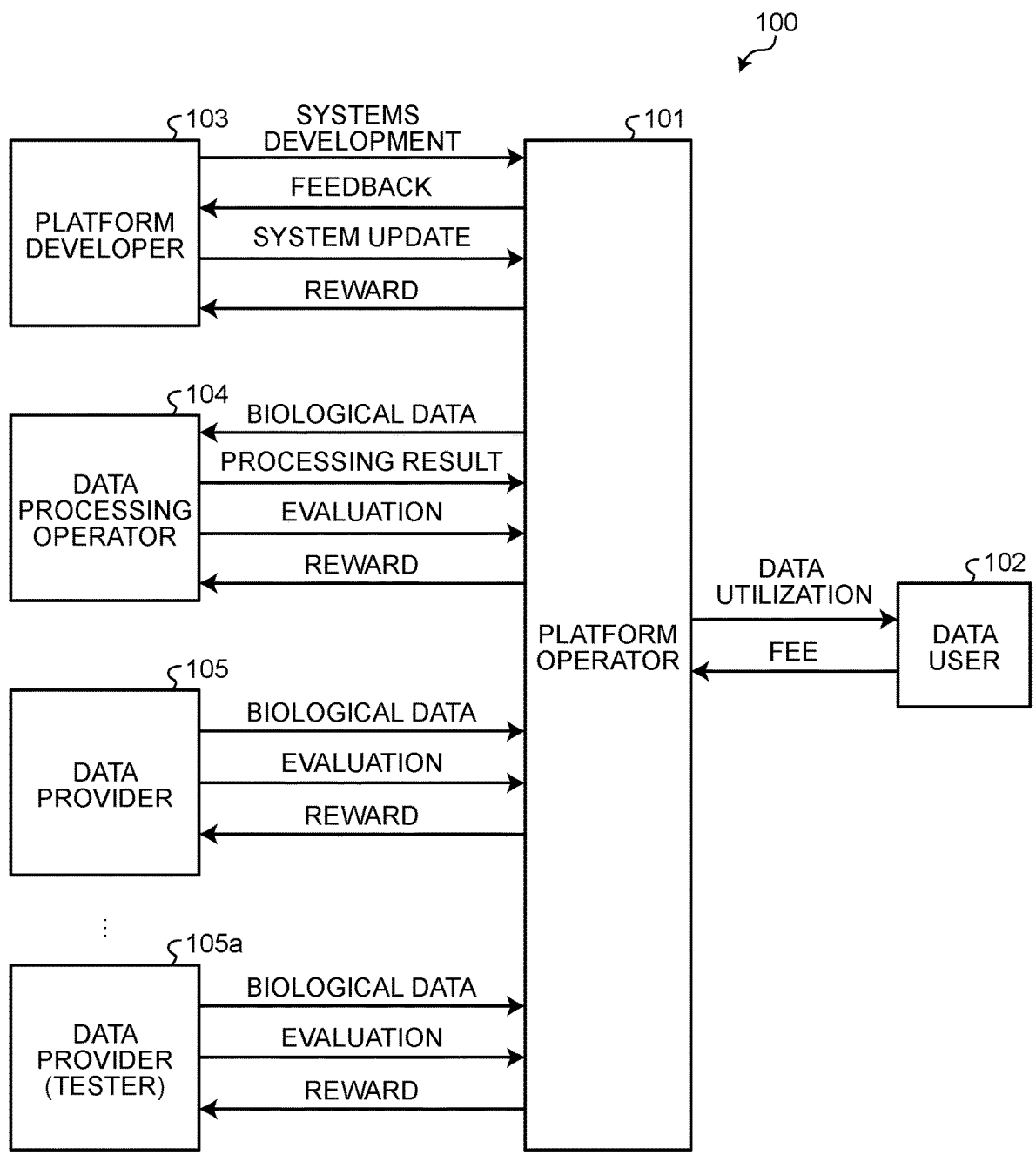
FIG. 1 is a schematic diagram illustrating a specific example of a business model for distributing and utilizing biological data to which a reward determination system according to an embodiment is applied.

An aspect (embodiment) for carrying out the present disclosure will be described in detail with reference to the drawings. The present disclosure is not limited to the description of the following embodiment. Constituents described below include those easily conceivable by those skilled in the art and those substantially identical thereto. Furthermore, the constituents described below can be appropriately combined. What is disclosed herein is merely an example, and the present disclosure naturally encompasses appropriate modifications easily conceivable by those skilled in the art while maintaining the gist of the disclosure. To further clarify the description, the drawings sometimes schematically illustrate, for example, widths, thicknesses, and shapes of parts, as compared with actual aspects thereof, but, they are merely examples, and interpretation of the present disclosure is not limited thereby. In this specification and in each figure, constituents similar to those already described with respect to the figures already referred to are denoted by the same reference numerals, and detailed description thereof may be omitted as appropriate.

FIG. 1 is a schematic diagram illustrating a specific example of a business model for distributing and utilizing biological data to which a reward determination system according to an embodiment is applied. A reward determination system 100 illustrated in FIG. 1 includes a platform operator 101, a data user 102, a platform developer 103, a data processing operator 104, and data providers 105, 105a.

The platform operator 101 is an operator that operates a platform for utilizing data on living bodies (hereinafter, also referred to simply as "the platform"). The data user 102, the data processing operator 104, and the data providers 105, 105a transmit or receive data on living bodies (hereinafter, also referred to as "the biological data") and various types of information and data associated with the biological data, via the platform operated by the platform operator 101. In the present disclosure, the platform is a blockchain platform built on a cloud network or on an on-premises network.

Examples of the data user 102 include, but are not limited to, business entities and organizations that use data on living bodies to operate businesses and make business plans such as medical institutions, insurance companies, pharmaceutical companies, and local governments. The biological data (such as brain wave data and heart rate data) continuously acquired by the data providers 105, 105a and provided by many data providers 105, 105a, are analyzed as big data by the data processing operator 104. Data including results of the analysis are utilized for medical treatment, health-care, marketing, and the like.

The data user 102 utilizes the data provided via the platform and pays a fee for the data usage. The fee paid by the data user 102 includes a usage fee paid to the platform operator 101 and rewards paid to the platform developer 103, the data processing operator 104, and the data providers 105, 105a in the present disclosure. For example, the usage fee is paid to the platform operator 101 in fiat currency (legal currency) such as Japanese yen, US dollars, or euros, whereas the rewards are paid to the platform developer 103, the data processing operator 104, and the data providers 105, 105a in cryptocurrency (virtual currency) such as tokens, for example.

The platform developer 103 is, for example, an operator that conducts a system development business for the platform. In the present disclosure, the system development business includes businesses necessary for maintenance and operation of the entirety of the platform, such as development of infrastructure systems such as networks, cloud computing, and application software that are necessary for the platform, and total system designing, system testing, system security management, and system update and maintenance that are associated with the development of infrastructure systems.

The platform developer 103 may provide a platform system in-house-developed by the platform developer 103 to the platform operator 101 and the data user 102, or, for example, may be entrusted by the platform operator 101 or the data user 102 with the system development of the platform. Alternatively, the platform developer 103 may conduct a development business for a biological information sensor for acquiring the biological data (for example, a vital sensor for acquiring brain wave data, heart rate data, and the like) or may be partially entrusted with a system development business for the platform. The biological information sensor is not limited to the sensor for acquiring brain wave data, heart rate data, and the like, and may be, for example, a vital sensor capable of acquiring various kinds of biological information such as blood flow, blood pressure, body temperature, skin temperature, $SpO_2$ (blood oxygen saturation), and the like.

The data processing operator 104 is an operator that conducts data processing business such as preprocessing (cleansing, integration, conversion, and the like), model training, and anomaly identification processing of biological data provided by the data providers 105 and 105a. The biological data provided by the data providers 105 and 105a are given high added value through model training and condition identification (for example, the presence or absence of anomalies) processing using a trained model and are used in a business of the data user 102. The data processing operator 104 sometimes evaluates platform malfunctions on its own system and provides feedback to the platform developer 103.

The data providers 105, 105a transmit the biological data acquired by a biological information sensor to a system via an information and communication terminal device such as a smartphone, for example. The biological information sensor may be purchased and owned by the data providers 105, 105a, or may be loaned by a medical institution or the like.

It is assumed that some data providers 105a of the data providers 105, 105a also serve as testers (test engineers) for application software, biological information sensors, and the like. In this case, the data providers 105a evaluate the application software and the biological information sensor and feed back a bug report (malfunction information) and the like to the platform developer 103. In addition, the data provider 105 other than the testers sometimes evaluates the application software and a system of the platform and feeds back malfunctions of the application software and the system to the platform developer 103 via a customer service of the platform operator 101, for example.

In the present disclosure, it is assumed that the platform developer 103, the data processing operator 104, and the data providers 105, 105a are targets of the distribution of a reward received from the data user 102. A reward to each of the reward distribution targets is determined in accordance with contribution and reliability of the reward distribution target in the biological data utilization business of the data user 102. The contribution and the reliability in the present disclosure will be described later with reference to FIG. 2 and the subsequent figures.

As described above, it is assumed that the data processing operator 104 and the data providers 105, 105a not only perform their respective ordinary data processing business and ordinary data provision, but also take partial charge of tasks that should be originally performed by the platform developer 103, such as feeding back malfunctions in the platform and malfunctions in the application software and the system to the platform developer 103. Furthermore, biological data acquired on a one-off basis and biological data provided intensively in a short period sometimes cause a problem of cheating, for example, using falsified data or fraudulently using the same data two or more times.

In the present disclosure, each of the platform developer 103, the data processing operator 104, and the data providers 105, 105a is assumed as a target of the distribution of a reward received from the data user 102 (hereinafter, also referred to simply as "the reward distribution target"). Tasks undertaken by these reward distribution targets are classified into a development task, a data processing task, and a data provision task. Then, based on task information obtained by quantifying the workload of each of the tasks into numbers, the reliability and the contribution of each of the tasks are quantified into numbers to calculate a reliability parameter and a contribution parameter for each of the tasks. Furthermore, based on the reliability parameter and the contribution parameter of each of the tasks, the distribution of a reward among the reward distribution targets is determined. Thus, a reward can be distributed in proportion to the load of maintenance and operation of the platform. The development task, the data processing task, and the data provision task in the present disclosure will be described later together with the contribution parameter and the reliability parameter, with reference to FIG. 2 and the subsequent figures.

Figure 2:
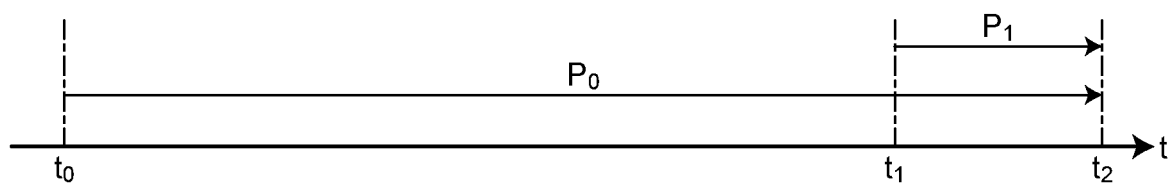
FIG. 2 is a time chart illustrating an example of a reliability calculation period and a contribution calculation period according to the embodiment.

In the present disclosure, the reliability parameter of each of the tasks is calculated based on long-term evaluation, and the contribution parameter of each of the tasks is calculated based on shorter-term evaluation than that of the reliability parameter of each of the tasks. FIG. 2 is a time chart illustrating an example of a reliability calculation period and a contribution calculation period according to the embodiment.

As illustrated in FIG. 2, in the present disclosure, a reliability calculation period $P_0$ is equal to or longer than a contribution calculation period $P_1$. The reliability calculation period $P_0$ is targeted for calculating a reliability parameter of each of the tasks. The contribution calculation period $P_1$ is targeted for calculating a contribution parameter of each of the tasks. Specifically, the reliability calculation period $P_0$ and the contribution calculation period $P_1$ for each of the tasks are set as follows. Assuming that the day preceding the execution of reward determination processing described later is an expiration date $t_2$. The day obtained by going back a predetermined period (specifically, one month, for example) from the expiration date $t_2$ of the contribution calculation period $P_1$ of each of the tasks is set as a start date $t_1$ of the contribution calculation period $P_1$ of the task. On the other hand, for example, a start date of a platform development project is set as a start date $t_0$ of the reliability calculation period $P_0$ of each of the tasks. When the period from the start date of the platform development project to the day preceding the execution of the reward determination processing described later is equal to or shorter than the contribution calculation period $P_1$ of each of the tasks, the reliability calculation period $P_0$ and the contribution calculation target period $P_1$ of each of the tasks are the same.

In the present disclosure, a reward to be paid to each of the reward distribution targets is determined based on a reliability parameter calculated based on long-term evaluation and a contribution parameter calculated based on short-term evaluation. Thus, an incentive can be appropriately given to the reward distribution targets. Specifically, for example, the data providers 105, 105a are motivated to continuously provide biological data over a long period.

Figure 3:
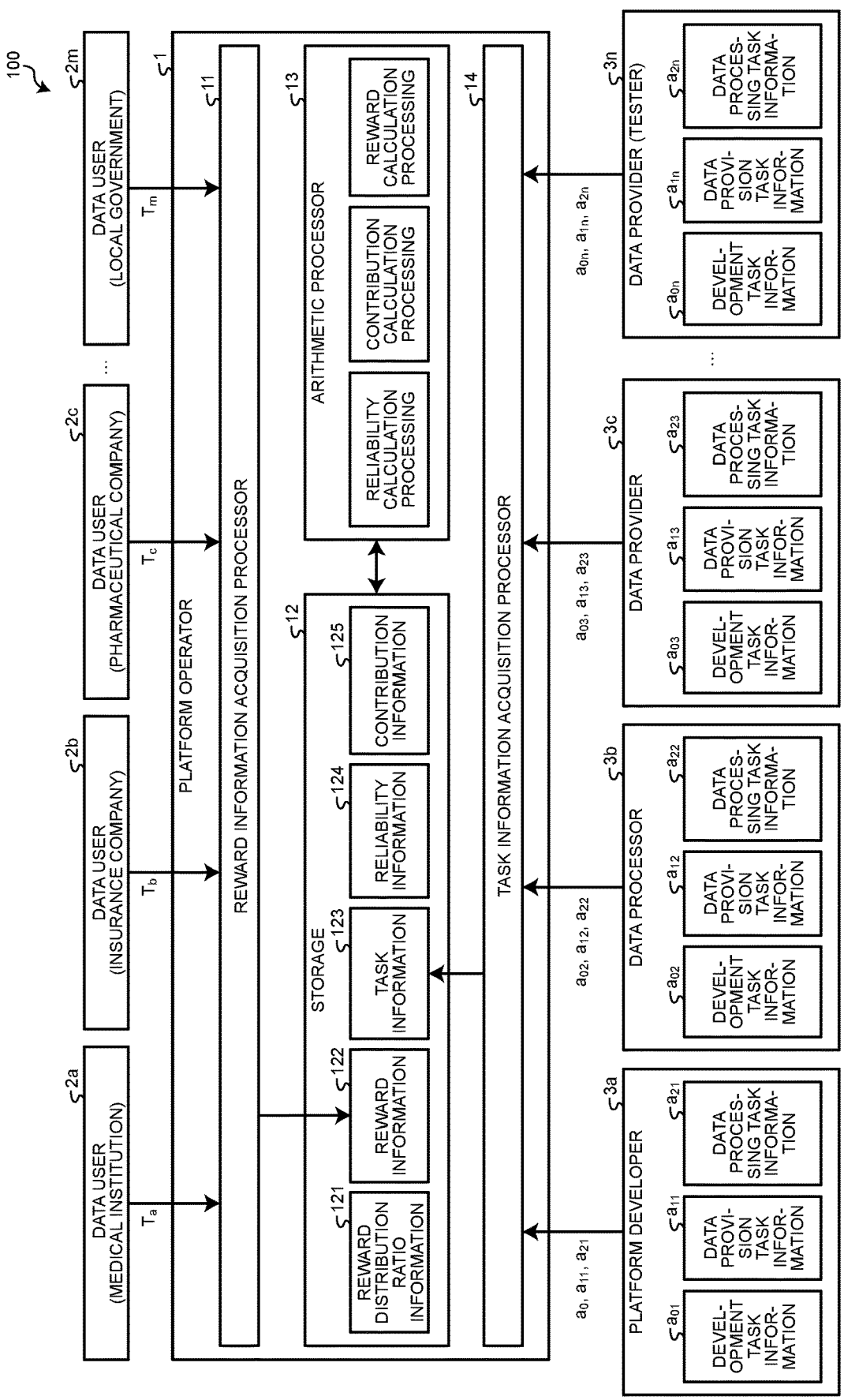
FIG. 3 is a conceptual diagram illustrating an example of the reward determination system according to the embodiment.

Hereinafter, a specific example of the reward determination system according to the embodiment will be described. FIG. 3 is a conceptual diagram illustrating an example of the reward determination system according to the embodiment.

The reward determination system 100 is installed on a cloud network or on an on-premises network, for example. A server 1 is, for example, a server owned by the platform operator 101. The server 1 may be configured with, for example, a plurality of application servers and/or a plurality of database servers. The present disclosure is not limited by the ownership or configuration of the server 1.

The server 1 includes a reward information acquisition processor 11, a storage 12, an arithmetic processor 13, and a task information acquisition processor 14.

The platform in the present disclosure determines a reward to be allocated to each of the reward distribution targets every predetermined period. Specifically, the reward determination system 100 executes reward determination processing, for example, every month. The interval of execution of the reward determination processing is not limited to one month. For example, the reward determination processing may be performed every other month (for example, in odd-numbered months or even-numbered months).

In FIG. 3, the number of the data users 102 is m (wherein m is a natural number). The reward information acquisition processor 11 of the server 1 acquires information on the amount of a reward to be distributed to the reward distribution targets from each of terminal devices 2a, 2b, 2c, . . . , 2m of the data users 102. In FIG. 3, a medical institution, an insurance company, a pharmaceutical company, . . . , and a local government are illustrated as the data users 102. The terminal devices 2a, 2b, 2c, . . . , 2m are computers including a CPU and a memory, for example. The CPU of each of the terminal devices executes transmission of the information on the amount of the reward stored in the memory. Information on a reward T, which is the total of a reward amount $T_a$ transmitted from the terminal device 2a of the medical institution, and a reward amount $T_b$ transmitted from the terminal device 2b of the insurance company, a reward amount $T_c$ transmitted from the terminal device 2c of the pharmaceutical company, and a reward amount $T_m$ transmitted from the terminal device 2m of the local government, is stored as reward information 122 in the storage 12 of the server 1.

The present disclosure is not limited by the number or types of the data users 102. The data user 102 may be, for example, any of a medical institution, an insurance company, a pharmaceutical company, . . . , and a local government, or may include, for example, a plurality of medical institutions, insurance companies, pharmaceutical companies, or local governments.

In FIG. 3, the number of the reward distribution targets is n (wherein n is a natural number). The task information acquisition processor 14 of the server 1 acquires development task information $a_0$, data provision task information $a_1$, and data processing task information $a_2$ from each of terminal devices 3a, 3b, 3c, . . . , 3n of the reward distribution targets. In the present disclosure, the development task information $a_0$, the data provision task information $a_1$, and the data processing task information $a_2$ are data obtained by quantifying the workloads of the respective tasks into numbers. The terminal devices 3a, 3b, 3c, . . . , 3n are computers including a CPU and a memory, for example. More specifically, the terminal devices 3c, 3n may be information communication terminal devices, such as smartphones, owned by the respective data providers 105, 105a. The CPU of each of the terminal devices executes transmission of the development task information $a_0$, the data provision task information $a_1$, and the data processing task information $a_2$, which are stored in the memory. The development task information $a_0$, the data provision task information $a_1$, and the data processing task information $a_2$, which are transmitted from each of the terminal devices $3a$, $3b$, $3c$, ..., $3n$ of the reward distribution targets, are stored as task information 123 in the storage 12 of the server 1.

Figure 4A:
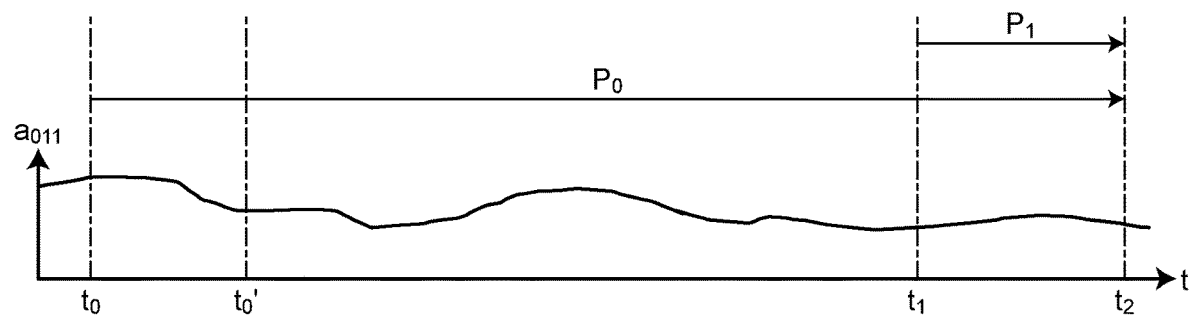
FIG. 4A is a diagram illustrating changes in a first example of development task information over time.
Figure 4B:
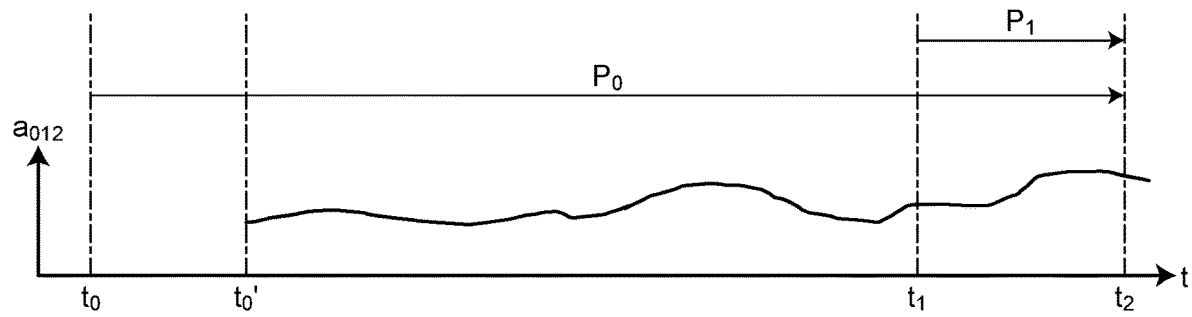
FIG. 4B is a diagram illustrating changes in a second example of development task information over time.

FIG. 4A is a diagram illustrating changes in a first example of the development task information over time. FIG. 4B is a diagram illustrating changes in a second example of the development task information over time. In FIG. 4A and FIG. 4B, development task information of the platform developer 103 is illustrated. In FIG. 4A and FIG. 4B, $t_0$ is a start date of a platform development project and indicates a start date of the reliability calculation period $P_0$ in the reward determination processing described later. $t_0'$ is a start date of service of the platform. $t_1$ is a start date of the contribution calculation period $P_1$. $t_2$ is an expiration date of each of the reliability calculation period $P_0$ and the contribution calculation period $P_1$.

In FIG. 4A, the man-hours of platform development performed by the platform developer 103 is quantified into numbers as development task information $a_{011}$, and changes in the development task information $a_{011}$ over time are illustrated. Examples of the man-hours of the platform development include, but are not limited to, the man-hours of development of an infrastructure system, such as a network, a cloud, or application software, required for the platform, the man-hours of development of security, and the man-hours of bug fixing work. The development task information $a_{011}$ is, for example, total working hours per day obtained by multiplying the number of persons required for the platform development by working hours.

In FIG. 4B, the man-hours of support work by the platform developer 103 is quantified into numbers as development task information $a_{012}$, and changes in the development task information $a_{012}$ over time are illustrated. Examples of the man-hours of the system support work include, but are not limited to, the man-hours of customer service. The development task information $a_{012}$ is, for example, total working hours per day obtained by multiplying the number of persons required for the user support for the platform by working hours.

In this example, the man-hours of the platform development and the man-hours of the support work are each quantified into numbers and are illustrated as the development task information of the platform developer 103, but, the development task may be further subdivided. The man-hours regarded as the development task information of each of the data processing operator 104 and the data providers 105 and 105a are different from the man-hours regarded as the development task information of the platform developer 103. Specifically, for a development task of the data processing operator 104, for example, the man-hours of evaluation of malfunctions in the platform on its own system may be quantified into numbers and regarded as development task information. For a development task of the data providers 105 and 105a, for example, the man-hours of evaluation and/or bug report preparation for application software or a biological information sensor, the man-hours of system evaluation of the platform and/or application software, etc. may be quantified into numbers and regarded as development task information.

Figure 5A:
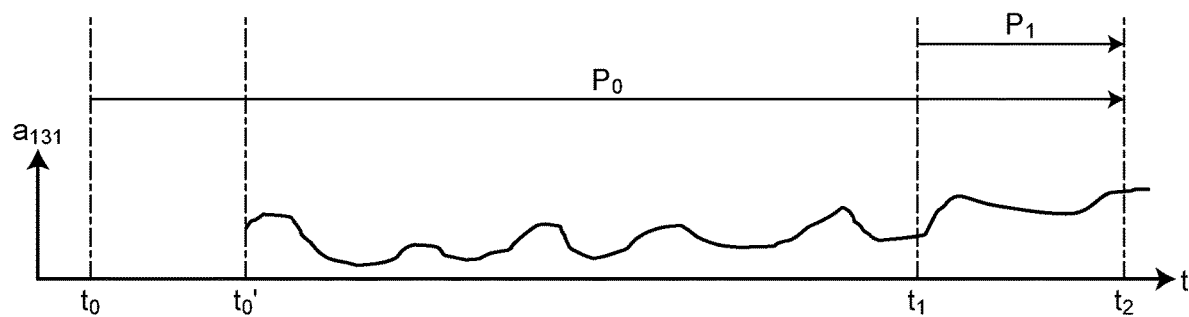
FIG. 5A is a diagram illustrating changes in a first example of data provision task information over time.
Figure 5B:
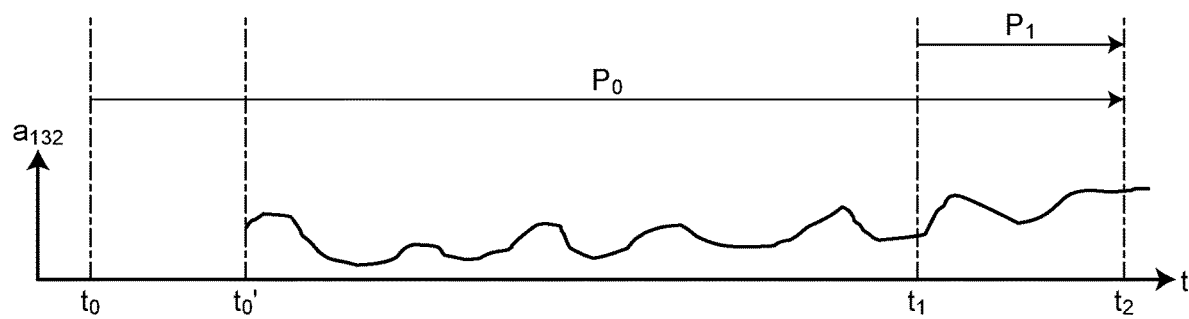
FIG. 5B is a diagram illustrating changes in a second example of data provision task information over time.

FIG. 5A is a diagram illustrating changes in a first example of the data provision task information over time. FIG. 5B is a diagram illustrating changes in a second example of the data provision task information over time. In FIG. 5A and FIG. 5B, the data provision task information of the data providers 105 and 105a is illustrated. In FIG. 5A and FIG. 5B, $t_0$ is the start date of the platform development project and indicates the start date of the reliability calculation period $P_0$ in the reward determination processing described later. $t_0'$ is a start date of service of the platform. $t_1$ is the start date of the contribution calculation period $P_1$. $t_2$ is the expiration date of each of the reliability calculation period $P_0$ and the contribution calculation period $P_1$. For the data provision task, the start date $t_0'$ of service of the platform may be regarded as the start date of the reliability calculation period $P_0$.

In FIG. 5A, the frequency of provision of biological data (for example, brain wave data and heart rate data) by the data provider 105 is quantified into numbers as data provision task information $a_{131}$, and changes in the data provision task information $a_{131}$ over time are illustrated. The frequency of provision of the biological data is, for example, the number of times that the biological data are provided per day (for example, providing one minute data is counted as one).

In FIG. 5B, the frequency of provision of an activity data label by the data providers 105 and 105a is quantified into numbers as data provision task information $a_{132}$, and changes in the data provision task information $a_{132}$ over time are illustrated. The frequency of provision of the activity data label is, for example, the number of times that the activity data label is provided per day (for example, providing one type of data is counted as one). Examples of the activity data label include, but are not limited to, information provided by the data provider 105 accompanying the biological data, such as whether the data provider 105 is in good or bad physical condition, a stress level based on subjective sensation, the quality of sleep based on subjective sensation, whether medicine is taken or not, and whether exercise is taken or not.

In this example, the frequency of provision of the biological data and the frequency of provision of the activity data label are each quantified into numbers and illustrated as the data provision task information provided by the data providers 105, 105a, but a plurality of types of biological data (for example, brain wave data and heart rate data) may be acquired, and the frequencies of provision of these types of the biological data may be quantified into numbers as different types of data provision task information. Furthermore, like the data provision task information provided by the data providers 105 and 105a, the workload to be quantified into numbers as data provision task information provided by the platform developer 103 and the data processing operator 104 may also be obtained by quantifying the frequency of provision of the biological data and the frequency of provision of the activity data label into numbers.

Figure 6A:
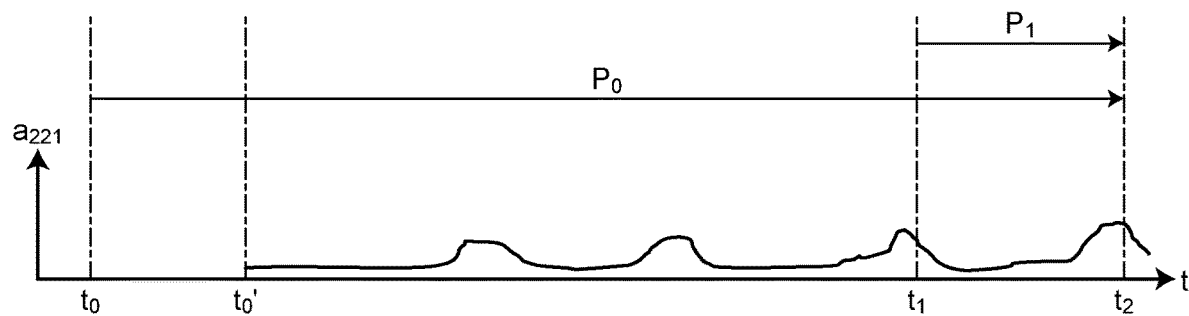
FIG. 6A is a diagram illustrating changes in a first example of data processing task information over time.
Figure 6B:
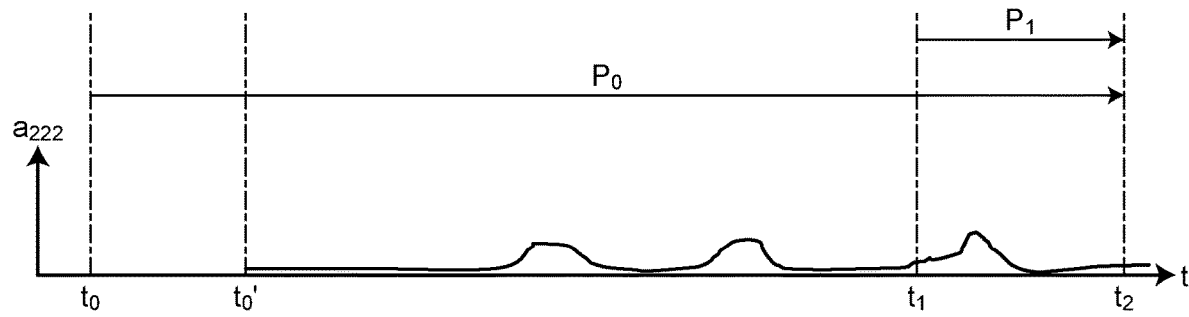
FIG. 6B is a diagram illustrating changes in a second example of data processing task information over time.

FIG. 6A is a diagram illustrating changes in a first example of the data processing task information. FIG. 6B is a diagram illustrating changes in a second example of the data processing task information over time. In FIG. 6A and FIG. 6B, data processing task information of the data processing operator 104 is illustrated. In FIG. 6A and FIG. 6B, $t_0$ is the start date of the platform development project and indicates the start date of the reliability calculation period $P_0$ in the reward determination processing described later. $t_0'$ is the start date of service of the platform. $t_1$ is the start date of the contribution calculation period $P_1$. $t_2$ is the expiration date of each of the reliability calculation period $P_0$ and the contribution calculation period $P_1$. For the data processing task, the start date $t_0'$ of service of the platform may be regarded as the start date of the reliability calculation target period $P_0$.

In FIG. 6A, the number of cases of model training performed by the data processing operator 104 is quantified into numbers as data processing task information $a_{221}$, and changes in the data processing task information $a_{221}$ over time are illustrated.

In FIG. 6B, the number of cases of anomaly identification performed by the data processing operator 104 is quantified as data processing task information $a_{222}$ into numbers, and changes in the data processing task information $a_{222}$ over time are illustrated.

In this example, a case in which the number of cases of model training and the number of cases of anomaly identification are quantified into numbers as data processing task information of the data processing operator 104 are exemplified, but the data processing task can be further subdivided. The workload to be quantified into numbers as data processing task information of the platform developer 103 and the data providers 105, 105a may be different from or similar to that of the data processing task information of the data processing operator 104.

Figures 7, 8:
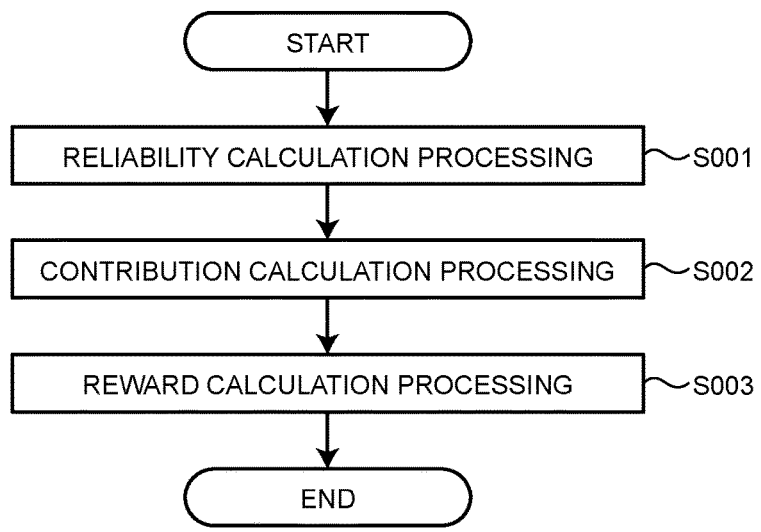
FIG. 7 is a diagram illustrating an example of task information.
FIG. 8 is a flowchart illustrating an example of reward determination processing according to the embodiment.

FIG. 7 is a diagram illustrating an example of task information. Task information $a_0$, $a_1$, $a_2$ on the tasks of each of the reward distribution targets are each sequentially acquired, for example, via a cloud network or an on-premises network after the start date $t_0$ of the platform development project or the start date $t_0'$ of a service of the platform, and chronologically stored and accumulated in the storage 12 of the server 1 as task information 123 illustrated in FIG. 7. The maximum value $a_0\text{max}$ of the task information $a_0$, the maximum value $a_1\text{max}$ of the task information $a_1$, and the maximum value $a_2\text{max}$ of the task information $a_2$ are stored in the storage 12.

Specifically, for example, the maximum value $a_{011}\text{max}$ of the development task information $a_{011}$ of the platform developer 103 is preset to a value obtained by multiplying the maximum number of persons required for the development of the platform by the maximum working hours for one day (for example, 8 hours). When the development task information $a_{011}$ of the platform developer 103 exceeds the maximum value $a_{011}\text{max}$, it is set that $a_{011}=a_{011}\text{max}$.

For example, the maximum value $a_{131}\text{max}$ of data provision task information $a_{131}$ of the data provider 105 is the maximum frequency of provision of biological data (for example, brain wave data or heart rate data). The maximum frequency of provision of the biological data is predetermined. When the data provision task information $a_{131}$ of the data provider 105 exceeds the maximum value $a_{131}\text{max}$, $a_{131}=a_{131}\text{max}$ is set.

For example, the maximum value $a_{221}\text{max}$ of the data processing task information $a_{221}$ of the data processing operator 104 is the maximum number of cases of model training. The maximum number of cases of the model training is predetermined. When the data processing task information $a_{221}$ of the data processing operator 104 exceeds the maximum value $a_{221}\text{max}$, $a_{221}=a_{221}\text{max}$ is set.

FIG. 8 is a flowchart illustrating an example of the reward determination processing according to the embodiment. In the reward determination processing illustrated in FIG. 8, the arithmetic processor 13 of the server 1 executes the reliability calculation processing and the contribution calculation processing for the tasks of each of the reward distribution targets, and also executes the reward calculation processing for each of the reward distribution targets. Hereinafter, specific examples of each type of the calculation processing in the reward determination processing illustrated in FIG. 8 will be described.

The reward determination processing illustrated in FIG. 8 is executed every predetermined period. The reward determination processing may be, for example, executed at intervals of one month or two months (for example, in odd-numbered or even-numbered months). In an aspect in which the reward determination processing is executed at intervals of one month, information on the amount of the rewards of each of the reward distribution targets is transmitted from the data user 102, for example, via a cloud network or an on-premises network by a predetermined date (for example, the end of the month), and is stored in the storage 12 of the server 1 as reward information 122 illustrated in FIG. 4.

After the reward information 122 is stored and the reward determination processing illustrated in FIG. 8 is executed, the arithmetic processor 13 refers to the task information 123 in the storage 12 and executes the reliability calculation processing for each of the tasks of a reward distribution target i (wherein i is a natural number from 1 to n) (Step S001).

The arithmetic processor 13 calculates a reliability parameter $r_{0i}$ for the development task of the reward distribution target i by using the following formula (1). In the following formula (1), $N_0$ is the number of the development tasks (the number of types of the development tasks).

$$r_{0i} = \frac{\left( \dfrac{\sum_{t=t_0}^{t_2}(a_{0i1})_t}{\sum_{t=t_0}^{t_2}(a_{0i1}\text{max})_t} + \dfrac{\sum_{t=t_0}^{t_2}(a_{0i2})_t}{\sum_{t=t_0}^{t_2}(a_{0i2}\text{max})_t} + \ldots \right)}{N_0} \quad (1)$$

The arithmetic processor 13 calculates a reliability parameter $r_{1i}$ for a data provision task of the reward distribution target i by using the following formula (2). In the following formula (2), $N_1$ is the number of the data provision tasks (the number of types of the data provision tasks).

$$r_{1i} = \frac{\left( \dfrac{\sum_{t=t_0}^{t_2}(a_{1i1})_t}{\sum_{t=t_0}^{t_2}(a_{1i1}\text{max})_t} + \dfrac{\sum_{t=t_0}^{t_2}(a_{1i2})_t}{\sum_{t=t_0}^{t_2}(a_{1i2}\text{max})_t} + \ldots \right)}{N_1} \quad (2)$$

The arithmetic processor 13 calculates a reliability parameter $r_{2i}$ for a data processing task of the reward distribution target i by using the following formula (3). In the following formula (3), $N_2$ is the number (type) of the data processing tasks (the number of types of the data processing tasks).

$$r_{2i} = \frac{\left( \dfrac{\sum_{t=t_0}^{t_2}(a_{2i1})_t}{\sum_{t=t_0}^{t_2}(a_{2i1}\text{max})_t} + \dfrac{\sum_{t=t_0}^{t_2}(a_{2i2})_t}{\sum_{t=t_0}^{t_2}(a_{2i2}\text{max})_t} + \ldots \right)}{N_2} \quad (3)$$

The respective reliability parameters $r_{0i}$, $r_{1i}$, and $r_{2i}$ of the tasks calculated by using the formula (1), the formula (2), and the formula (3) are normalized values obtained when their maximum values are each defined as 1.

The arithmetic processor 13 stores the reliability parameters $r_{0i}$, $r_{1i}$, and $r_{2i}$ of the respective tasks of the reward distribution target i, which are calculated in the reliability calculation processing (Step S001), as reliability information 124 in the storage 12. FIG. 9 is a diagram illustrating an example of the reliability information.

Subsequently, the arithmetic processor 13 refers to the task information 123 in the storage 12 and executes the contribution calculation processing for each of the tasks of the reward distribution target i (Step S002).

The arithmetic processor 13 calculates a contribution parameter $c_{0i}$ for the development task of the reward distribution target i by using the following formula (4). In the following formula (4), $N_0$ is the number of the development tasks (the number of types of the development tasks).

$$c_{0i} = \frac{\left( \frac{\sum_{t=t_1}^{t_2}(a_{0i1})_t}{\sum_{t=t_1}^{t_2}(a_{0i1}\max)_t} + \frac{\sum_{t=t_1}^{t_2}(a_{0i2})_t}{\sum_{t=t_1}^{t_2}(a_{0i2}\max)_t} + \ldots \right)}{N_0} \quad (4)$$

The arithmetic processor 13 calculates a contribution parameter $c_{1i}$ for the data provision task of the reward distribution target i by using the following formula (5). In the following formula (5), $N_1$ is the number of the data provision tasks (the number of types of the data provision tasks).

$$c_{1i} = \frac{\left( \frac{\sum_{t=t_1}^{t_2}(a_{1i1})_t}{\sum_{t=t_1}^{t_2}(a_{1i1}\max)_t} + \frac{\sum_{t=t_1}^{t_2}(a_{1i2})_t}{\sum_{t=t_1}^{t_2}(a_{1i2}\max)_t} + \ldots \right)}{N_1} \quad (5)$$

The arithmetic processor 13 calculates a contribution parameter $c_{2i}$ for the data processing task of the reward distribution target i by using the following formula (6). In the following formula (6), $N_2$ is the number of the data processing tasks (the number of types of the data processing tasks).

$$c_{2i} = \frac{\left( \frac{\sum_{t=t_1}^{t_2}(a_{2i1})_t}{\sum_{t=t_1}^{t_2}(a_{2i1}\max)_t} + \frac{\sum_{t=t_1}^{t_2}(a_{2i2})_t}{\sum_{t=t_1}^{t_2}(a_{2i2}\max)_t} + \ldots \right)}{N_2} \quad (6)$$

The respective contribution parameters $c_{01}$, $c_{11}$, and $c_{2i}$ of the tasks calculated by the formula (4), the formula (5), and the formula (6) are normalized values obtained when their maximum values are each defined as 1.

The arithmetic processor 13 stores the contribution parameters $c_{0i}$, $c_{1i}$, and $c_{2i}$ of the respective tasks of the reward distribution target i, which are calculated in the contribution calculation processing (Step S002), as contribution information 125 in the storage 12. FIG. 10 is a diagram illustrating an example of the contribution information.

Using the reliability parameters $r_{0i}$, $r_{1i}$, $r_{2i}$ and the contribution parameters $c_{0i}$, $c_{1i}$, and $c_{2i}$ of the tasks, which are calculated as described above, the arithmetic processor 13 executes the reward calculation processing for each of the reward distribution targets (Step S003).

When a reward to the reward distribution target i among the reward distribution targets is defined as $R_i$, the reward T, which is the total amount of rewards received from the data user 102, is expressed by the following formula (7).

$$T = \sum_{i=1}^{n} R_i \quad (7)$$

In the present disclosure, a reward $R_i$ to the reward distribution target i is expressed by the following formula (8).

$$R_i = \alpha(\omega_0 r_{0i} c_{0i} + \omega_1 r_{1i} c_{1i} + \omega_2 r_{2i} c_{2i}) \quad (8)$$

In the formula (8), $\omega_0$ is a reward distribution coefficient for a development task. $\omega_1$ is a reward distribution coefficient for a data provision task. $\omega_2$ is a reward distribution coefficient for a data processing task. The reward distribution coefficients $\omega_0$, $\omega_1$, and $\omega_2$ indicate a distribution ratio of the reward for the development task, the reward for the data provision task, and the reward for the data processing task. The reward distribution ratio $\omega_0:\omega_1:\omega_2$ of the development task, the data provision task, and the data processing task is stored in advance as reward distribution ratio information 121 in the storage 12 of the server 1. The reward distribution ratio $\omega_1:\omega_1:\omega_2$ of the development task, the data provision task, and the data processing task for each of the reward distribution target is, for example, 100:2:20.

The values of the reward distribution coefficients $\omega_0$, $\omega_1$, $\omega_2$ in the reward distribution ratio $\omega_0:\omega_1:\omega_2$ of the development task, the data provision task, and the data processing task are merely examples, and the present disclosure is not limited by the values of the reward distribution coefficients $\omega_0$, $\omega_1$, $\omega_2$. The reward distribution ratio $\omega_0:\omega_1:\omega_2$ of the development task, the data provision task, and the data processing task, which is stored as the reward distribution ratio information 121 in the storage 12, may be stored in the form of a fixed value in the storage 12, or may be appropriately determined by the platform operator 101 or the data user 102 on the occasion of executing the reward determination processing.

In the formula (8), $\alpha$ is a correction factor for matching the reward T, which is the total amount of rewards received from the data user 102, with the total amount of rewards allocated to the reward distribution targets i. In the present disclosure, $\alpha$ is also referred to as "the base reward". The base reward a can be expressed by the following formula (9), based on the formula (7) and the formula (8).

$$\alpha = \frac{T}{\sum_{i=1}^{n}(\omega_0 r_{0i} c_{0i} + \omega_1 r_{1i} c_{1i} + \omega_2 r_{2i} c_{2i})} \quad (9)$$

In the reward calculation processing (Step S003), the arithmetic processor 13 calculates a reward $R_i$ for the reward distribution target i by using the formula (8) and the formula (9) to complete the reward determination processing.

FIG. 11A is a diagram illustrating an example of results of the reward determination processing for a platform developer. FIG. 11B is a diagram illustrating an example of results of the reward determination processing for a data processing operator. FIG. 11C is a diagram illustrating an example of results of the reward determination processing for a data provider. FIG. 11A illustrates calculation results of the reliability and the contribution of each of the tasks of the platform developer 103 and a reward calculation result for the platform developer 103. FIG. 11B illustrates calculation results of the reliability and the contribution of each of the tasks of the data processing operator 104 and a reward calculation result for the data processing operator 104. FIG. 11C illustrates calculation results of the reliability and the contribution of each of the tasks of the data provider 105 and a reward calculation result for the data provider 105. In FIG. 11A, FIG. 11B, and FIG. 11C, results calculated using the reward calculation ratio $\omega_0:\omega_1:\omega_2=100:2:20$ and the base reward $\alpha=\$10$ are illustrated.

As illustrated in FIG. 11A, the platform developer 103 has larger values of the development task information $a_{011}$, $a_{012}$, . . . , used for calculating the reliability parameter $r_{01}$ and the contribution parameter $c_{01}$ of the development task. Therefore, the reliability parameter $r_{01}$ and the contribution parameter $c_{01}$ of the development task are relatively larger than the reliability parameter $r_{11}$ and the contribution parameter $c_{11}$ of the data provision task and the reliability parameter $r_{21}$ and the contribution parameter $c_{21}$ of the data processing task.

As illustrated in FIG. 11B, the data processing operator 104 has larger values of the data processing task information $a_{221}$, $a_{222}$, . . . , used for calculating the reliability parameter $r_{22}$ and the contribution parameter $c_{22}$ of the data processing task. Therefore, the reliability parameter $r_{22}$ and the contribution parameter $c_{22}$ of the data processing task are relatively larger than the reliability parameter $r_{02}$ and the contribution parameter $c_{02}$ of the development task and the reliability parameter $r_{12}$ and the contribution parameter $c_{12}$ of the data provision task.

As illustrated in FIG. 11C, the data provider 105 has larger values of the data provision task information $a_{121}$, $a_{122}$, . . . used for calculating the reliability parameter $r_{13}$ and the contribution parameter $c_{13}$ of the data provision task. Therefore, the reliability parameter $r_{13}$ and the contribution parameter $c_{13}$ of the data provision task are relatively larger than the reliability parameter $r_{03}$ and the contribution parameter $c_{03}$ of the development task and the reliability parameter $r_{23}$ and the contribution parameter $c_{23}$ of the data processing task.

In the above-described reward determination processing according to the embodiment, the reliability parameter to be calculated based on long-term evaluation, the contribution parameter to be calculated based on short-term evaluation, and the reward can be efficiently calculated using the same calculation formulae, regardless of whether the reward distribution target is a developer, a data provider, or a data processing operator.

Furthermore, for example, in the case where the data provider 105 continuously provides biological data over a long period, both reliability parameter $r_{13}$ and contribution parameter $c_{13}$ of the data provision task become larger, which results in a higher reward. In contrast, for example, in the case where the data provider 105 intensively provides biological data in the latest short period, but the amount of biological data provided before that is small, the reliability parameter $r_{13}$ is smaller than the contribution parameter $c_{13}$.

In the reward determination processing according to the embodiment, the amount of a reward is determined by the product of the reliability parameter r ($r_{0i}$, $r_{1i}$, $r_{2i}$) calculated based on long-term evaluation and the contribution parameter c ($c_{0i}$, $c_{1i}$, $c_{2i}$) calculated based on short-term evaluation. Thus, for example, a large amount of reward can be prevented from being allocated to a cheater who fraudulently uses falsified data or the same data two or more times in a short period. Thus, an incentive can be appropriately given to the reward distribution targets.

The server 1 may include a plurality of application servers executing the reliability calculation processing, the contribution calculation processing, and the reward calculation processing, respectively. Specifically, a first application server may execute the reliability calculation processing (Step S001), a second application server may execute the contribution calculation processing (Step S002), and a third application server may execute the reward calculation processing (Step S003) by reading out respective reliability parameters of the tasks of each of the reward distribution targets from the reliability information 124, which is a result of the processing by the first application server, and reading out respective contribution parameters of the tasks of each of the reward distribution targets from the contribution information 125 as a result of the processing by the second application server.

The preferred embodiment of the present disclosure has been described above, but, the present disclosure is not limited to the embodiment. The content disclosed in the embodiment is merely an example, and can be variously modified within the scope without departing from the gist of the present disclosure. For example, a modification appropriately made within the scope without departing from the gist of the present disclosure naturally belongs to the technical scope of the present invention.

What is claimed is:

1. A reward determination system configured to determine distribution of a reward received from a data user to a plurality of reward distribution targets in a platform for distribution and utilization of biological data provided by a plurality of data providers, the reward determination system comprising:
    a server;
    a terminal device of the data user;
    a terminal device of a platform developer;
    a terminal device of a data processing operator; and
    terminal devices of the data providers, wherein
    the platform developer, the data processing operator, and the data providers are the reward distribution targets,
    the reward distribution targets each have:
        development task information obtained by quantifying a workload of a task required for developing the platform into numbers;
        data provision task information obtained by quantifying a workload of a task required for providing the biological data into numbers; and
        data processing task information obtained by quantifying a workload of a task required for processing the biological data into numbers,
    the server is configured to make communications with the terminal device of the data user, the terminal device of the platform developer, the terminal device of the data processing operator, and the terminal devices of the data providers, the server is configured to:
  receive the development task information, the data processing task information, and the data provision task information from the terminal device of the platform developer, the terminal device of the data processing operator, and the terminal devices of the data providers, respectively,
  receive reward information from the terminal device of the data user,
  calculate, for each reward distribution target, a reliability parameter and a contribution parameter of each of the tasks based on the development task information, the data provision task information, and the data processing task information,
  calculate, for each reward distribution target, a reward to be allocated for each of the tasks based on the reward information received from the terminal device of the data user and the reliability parameter and the contribution parameter calculated for each of the tasks, and
  calculate a reward to be allocated for each reward distribution target by summing, for each reward distribution target, the calculated rewards to be allocated for each of the tasks, and
a reliability calculation period for calculating the reliability parameter of each of the tasks is longer than a contribution calculation period for calculating the contribution parameter of each of the tasks.

2. The reward determination system according to claim 1, comprising:
  a storage configured to store at least the reward received from the data user and the development task information, the data provision task information, and the data processing task information on each of the tasks; and
  an arithmetic processor configured to calculate the reliability parameter and the contribution parameter of each of the tasks based on the development task information, the data provision task information, and the data processing task information, and calculate the reward to be allocated for each of the reward distribution targets based on the reliability parameter and the contribution parameter of each of the tasks.

3. The reward determination system according to claim 2, wherein
  the storage is configured to store a reward distribution coefficient for each of the tasks, and
  the arithmetic processor is configured to calculate a reward to be allocated for each of the reward distribution targets by multiplying a product of the reliability parameter and the contribution parameter of each of the tasks by the reward distribution coefficient for each of the tasks.

4. The reward determination system according to claim 1, wherein
  the reliability parameter of each of the tasks is an integrated value of task information acquired for each of the tasks during the reliability calculation period, and
  the contribution parameter of each of the tasks is an integrated value of task information acquired for each of the tasks during the contribution calculation period.

5. The reward determination system according to claim 4, wherein
  the development task information includes data obtained by quantifying man-hours of development business for the platform into numbers.

6. The reward determination system according to claim 4, wherein
  the development task information includes data obtained by quantifying man-hours of support business for the platform into numbers.

7. The reward determination system according to claim 4, wherein
  the data provision task information includes data obtained by quantifying a frequency of provision of the biological data into numbers.

8. The reward determination system according to claim 4, wherein
  the data provision task information includes data obtained by quantifying a frequency of provision of information on a health state of a provider of the biological data into numbers.

9. The reward determination system according to claim 4, wherein
  the data processing task information includes data obtained by quantifying man-hours of data processing business for the biological data into numbers.

10. The reward determination system according to claim 9, wherein
  the data processing task information includes data obtained by quantifying the number of cases of model training in data processing of the biological data into numbers.

11. The reward determination system according to claim 9, wherein
  the data processing task information includes data obtained by quantifying the number of cases of anomaly identification in the data processing of the biological data into numbers.

12. A reward determination method for determining, by a reward determination system, distribution of a reward received from a data user to a plurality of reward distribution targets in a platform for distribution and utilization of biological data provided by a plurality of data providers, wherein
  the reward determination system comprises:
    a server;
    a terminal device of the data user;
    a terminal device of a platform developer;
    a terminal device of a data processing operator; and
    terminal devices of the data providers, wherein
  the platform developer, the data processing operator, and the data providers are the reward distribution targets, and
  the reward distribution targets each have:
    development task information obtained by quantifying a workload of a task required for developing the platform into numbers;
    data provision task information obtained by quantifying a workload of a task required for providing the biological data into numbers; and
    data processing task information obtained by quantifying a workload of a task required for processing the biological data into numbers,
  the server is configured to make communications with the terminal device of the data user, the terminal device of the platform developer, the terminal device of the data processing operator, and the terminal devices of the data providers,
  the server:
    receives the development task information, the data processing task information, and the data provision task information from the terminal device of the platform developer, the terminal device of the data processing operator, and the terminal devices of the data providers, respectively, receives reward information from the terminal device of the data user, calculates, for each reward distribution target, a reliability parameter and a contribution parameter of each of the tasks based on the development task information, the data provision task information, and the data processing task information, calculates, for each reward distribution target, a reward to be allocated for each of the tasks based on the reward information received from the terminal device of the data user and the reliability parameter and the contribution parameter calculated for each of the tasks, and calculates a reward to be allocated for each reward distribution target by summing, for each reward distribution target, the calculated rewards to be allocated for each of the tasks, and a reliability calculation period for calculating the reliability parameter of each of the tasks is longer than a contribution calculation period for calculating the contribution parameter of each of the tasks.

13. The reward determination method according to claim 12, wherein
the reward to be allocated is determined for each of the reward distribution targets by multiplying a product of the reliability parameter and the contribution parameter of each of the tasks by a reward distribution coefficient for each of the tasks.

14. The reward determination method according to claim 12, wherein
the reliability parameter of each of the tasks is an integrated value of task information acquired for each of the tasks during the reliability calculation period, and
the contribution parameter of each of the tasks is an integrated value of task information acquired for each of the tasks during the contribution calculation period.

15. The reward determination method according to claim 14, wherein
the development task information includes data obtained by quantifying man-hours of development business for the platform into numbers.

16. The reward determination method according to claim 14, wherein
the development task information includes data obtained by quantifying man-hours of support business for the platform into numbers.

17. The reward determination method according to claim 14, wherein
the data provision task information includes data obtained by quantifying a frequency of provision of the biological data into numbers.

18. The reward determination method according to claim 14, wherein
the data provision task information includes data obtained by quantifying a frequency of provision of information on a health state of a provider of the biological data into numbers.

19. The reward determination method according to claim 14, wherein
the data processing task information includes data obtained by quantifying man-hours of data processing business for the biological data into numbers.

20. The reward determination method according to claim 19, wherein
the data processing task information includes data obtained by quantifying the number of cases of model training in data processing of the biological data into numbers.

21. The reward determination method according to claim 19, wherein
the data processing task information includes data obtained by quantifying the number of cases of abnormality identification in the data processing of the biological data into numbers.

22. The reward determination system according to claim 1, wherein
the reliability parameter of each of the tasks is a parameter of reliability of the task performed by at least one of the platform developer, the data processing operator, and the data providers, and
the contribution parameter of each of the tasks is a parameter of contribution of the task performed by at least one of the platform developer, the data processing operator, and the data providers.

* * * * *